US010092823B2

(12) United States Patent
Saferin et al.

(10) Patent No.: US 10,092,823 B2
(45) Date of Patent: Oct. 9, 2018

(54) METHOD AND SYSTEM FOR CONDUCTING AND LINKING A TELEVISED GAME SHOW WITH PLAY OF A LOTTERY GAME

(71) Applicant: Scientific Games International, Inc., Newark, DE (US)

(72) Inventors: Steve Saferin, Atlanta, GA (US); Kyle Rogers, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 368 days.

(21) Appl. No.: 14/880,538

(22) Filed: Oct. 12, 2015

(65) Prior Publication Data

US 2016/0101349 A1 Apr. 14, 2016

Related U.S. Application Data

(60) Provisional application No. 62/062,173, filed on Oct. 10, 2014.

(51) Int. Cl.
*A63F 9/24* (2006.01)
*A63F 13/00* (2014.01)
(Continued)

(52) U.S. Cl.
CPC .......... *A63F 3/0605* (2013.01); *G07F 17/329* (2013.01); *G07F 17/3267* (2013.01); *A63F 2250/64* (2013.01); *A63F 2300/409* (2013.01)

(58) Field of Classification Search
CPC ................ A63F 3/0605; A63F 2250/64; A63F 2300/409; G07F 17/3267; G07F 17/329; H04N 21/4781
See application file for complete search history.

(56) References Cited

U.S. PATENT DOCUMENTS 5,034,807 A * 7/1991 Von Kohorn ........... A63F 13/12
348/E7.024
5,035,422 A * 7/1991 Berman .................. A63F 3/081
273/144 R
(Continued)

OTHER PUBLICATIONS

"Category:Lottery game shows in the United States". [online], [retrieved on Nov. 27, 2017]. <URL:https://en.wikipedia.org/wiki/Category:Lottery_game_shows_in_the_United_States>. 2 Pages.*
(Continued)

*Primary Examiner* — Milap Shah
(74) *Attorney, Agent, or Firm* — Dority & Manning, P.A.

(57) ABSTRACT

A lottery game is linked to a televised game show having a plurality of mini-games followed by a final bonus game. An audience is defined for the game show composed of members from a plurality of different lottery jurisdictions, and audience members are selected for play of a plurality of mini-games conducted during taping of the game show. A plurality of substitute mini-games are separately conducted and taped such that at least one substitute mini-game having a winner from each lottery jurisdiction is taped and stored. One or more winners of the actual mini-games are selected for play of the final bonus. The original version of the taped game show is prepared for broadcast to all of the lottery jurisdictions. The broadcast intended for transmission to any lottery jurisdiction that does not have a winner of an actual mini-game in the original taped version is modified by inserting into the broadcast one of the substitute mini-games having a winner from the respective lottery jurisdiction.

15 Claims, 9 Drawing Sheets

(51) Int. Cl.
*G07F 17/00* (2006.01)
*G07F 19/00* (2006.01)
*A63F 3/06* (2006.01)
*G07F 17/32* (2006.01)

(56) References Cited

U.S. PATENT DOCUMENTS 5,108,115 A * 4/1992 Berman .................. A63F 3/081 273/252
5,193,818 A * 3/1993 Leeson ..................... A63F 9/18 273/308
5,283,734 A * 2/1994 Von Kohorn ........... A63F 13/12 348/E7.024
5,297,802 A * 3/1994 Pocock ................... A63F 3/062 273/269
5,508,731 A * 4/1996 Kohorn ................... A63F 13/12 348/E7.024
5,759,101 A * 6/1998 Von Kohorn ........... A63F 13/12 348/E7.024
6,439,997 B1 * 8/2002 Brasseur ................ G06Q 30/02 463/40
6,447,396 B1 * 9/2002 Galyean, III ........... A63F 13/12 348/552
6,565,084 B1 * 5/2003 Katz ..................... A63F 13/005 273/138.1
6,616,143 B1 * 9/2003 Egner ..................... A63F 13/12 273/430
6,749,198 B2 6/2004 Katz et al.
6,783,460 B2 * 8/2004 Galyean, III ........... A63F 13/12 348/552
8,522,266 B1 * 8/2013 Kikinis ............ H04N 21/44016 348/460
2001/0003099 A1 * 6/2001 Von Kohorn ........... A63F 13/12 463/40
2001/0036865 A1 * 11/2001 Neal, III ................ G06Q 30/02 463/42
2001/0037376 A1 * 11/2001 Ullman ............. G06F 17/30855 709/218
2002/0037766 A1 3/2002 Muniz
2002/0152117 A1 * 10/2002 Cristofalo .............. G06Q 30/02 705/14.52
2004/0100581 A1 * 5/2004 Williams ............. H04H 20/103 348/473
2004/0111743 A1 * 6/2004 Moncreiff .............. H04N 7/165 725/35
2004/0209665 A1 10/2004 Walker et al.
2005/0246733 A1 * 11/2005 Pijper ..................... H04H 20/38 725/24
2006/0251383 A1 * 11/2006 Vronay ................ G11B 27/034 386/242
2007/0123220 A1 * 5/2007 Weiser .................... H04W 4/06 455/412.1
2007/0192784 A1 * 8/2007 Postrel ................... G06Q 20/10 725/23
2008/0085761 A1 * 4/2008 Bagwell .................... A63F 9/24 463/22
2008/0300042 A1 * 12/2008 Shimshi .................. G07F 17/32 463/17
2009/0117966 A1 * 5/2009 Rogers ................. G07C 15/005 463/17
2009/0176549 A1 * 7/2009 Saig ........................ G07F 17/32 463/17
2009/0186677 A1 7/2009 Corriveau
2009/0249389 A1 * 10/2009 Katz .................. G06Q 30/0241 725/32
2010/0029362 A1 2/2010 Bennett, III et al.
2010/0160046 A1 * 6/2010 Prusack .................... A63F 3/08 463/40
2011/0059786 A1 3/2011 Walker et al.
2012/0059954 A1 * 3/2012 Gilson ............. H04N 21/23438 709/246
2012/0124608 A1 * 5/2012 Postrel ................... G06Q 10/02 725/23
2014/0073384 A1 * 3/2014 Oikonomidis ... H04N 21/25866 463/9
2014/0295932 A1 10/2014 Irwin, Jr.
2015/0290552 A1 * 10/2015 Owoc ....................... A63J 1/00 472/75
2016/0101348 A1 * 4/2016 Rogers .................. A63F 3/0605 463/17
2016/0101350 A1 * 4/2016 Rogers .................. A63F 3/0605 463/17
2016/0101351 A1 * 4/2016 Rogers .................. A63F 3/0605 463/17
2016/0101352 A1 * 4/2016 Rogers .................. A63F 3/0605 463/17
2016/0155294 A1 * 6/2016 Mound ............... G07F 17/3241 463/17
2017/0034654 A1 * 2/2017 Oberbeck ............. H04W 4/021

OTHER PUBLICATIONS

PCT Search Report and Written Opinion, dated Jan. 18, 2016.

* cited by examiner

METHOD AND SYSTEM FOR CONDUCTING AND LINKING A TELEVISED GAME SHOW WITH PLAY OF A LOTTERY GAME

PRIORITY CLAIM

The present invention claims priority to U.S. Provisional Patent Application Ser. No. 62/062,173, filed Oct. 10, 2014.

FIELD OF THE INVENTION

The present invention relates to conducting second chance game events (e.g., bonus games) associated with a primary lottery game, wherein the bonus game culminates in a televised game show.

BACKGROUND

Lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out. Consequently, both lotteries and their service providers are presently searching for new methods of increasing sales and expanding the gaming experience for players.

In one attempt to increase sales, United States lotteries have adopted second chance games where the consumer can enter losing lottery ticket codes on lottery Internet sites to play instant second chance games (also referred to as "bonus games") or to enter second chance drawings. However, for the most part, second chance games usually involve prizes of a minor nature compared to the main lottery games and, although having some impact, are generally not recognized as a significant promoter of sales of the primary game.

In an attempt to increase participation in the primary games, certain state jurisdictions in the United States have implemented "player clubs" wherein participants register loosing primary tickets from multiple primary games into an online player account. The losing tickets are treated as entries into periodic drawings for secondary prizes. For example, Georgia sponsors a "PLAYERS CLUB" program wherein registered participants enter non-winning Georgia Lottery instant tickets via an online account into a second chance drawing program. Monthly drawings are conducted for an array of different awards, such as a monthly grand cash prize, featured prizes, and "points" awards that may be redeemed at a number of participating sponsors.

U.S. Pat. Pub. No. 2009-0117966 describes another method to enhance a player's experience in a lottery game, and thus encourage increased participation in the game. According to this patent application, a raffle number is assigned to each lottery ticket to be used in a subsequent raffle drawing. The raffle is conducted in conjunction with an independent third party event that is unrestrained by the lottery and awards a prize that is independent of the lottery. A typical third party event may be, for example, a televised contest or game show wherein contestants compete for an award. The lottery raffle prize is a function of the winning contestant's award. For example, the raffle prize may have a value equivalent to the value of the contestant's award, or may have an increased value based on a multiplication of the winning contestant's award. The lottery game component may have a theme based on the game show, and the raffle drawing can be conducted in conjunction with the game show, and may be televised during or immediately after the game show.

The lottery industry is thus continuously seeking new and creative game scenarios, particularly in regards to second chance games, that provide increased entertainment value to players, entice new players, and expand play of lottery games into a multi-faceted gaming experience beyond the mere purchase of a lottery ticket

SUMMARY OF THE INVENTION

Objects and advantages of the invention will be set forth in part in the following description, or may be obvious from the description, or may be learned through practice of the invention.

In a particular embodiment, a method is provided for conducting and linking a televised game show with play of a lottery game. The game show is composed of a plurality of mini-games wherein one or more contestants compete in a game or contest for skill or chance. One or more winners of the mini-games compete in a final bonus game, which may also be a game of skill or chance. A "winner" in the mini-games may be any player that achieves a defined level of success in the mini-game, such as a minimum score in a game of chance or skill, or wins a minimum prize amount in a game of skill or chance. It should be readily appreciated that the particular type of mini-game (e.g., game rules or objects) is not a limiting feature of the invention and that a broad array of suitable games of chance or skill may be implemented.

An audience is compiled for the game show and is composed of members from a plurality of different lottery jurisdictions, wherein each lottery jurisdiction has a defined minimum number of audience members.

Members of the game show audience are selected by random or other means for play of one of a plurality of actual mini-games conducted during live broadcast or taping of the televised game show. For example, a single televised game show may include ten separate mini-games. Each mini-game may have a prize associated therewith that is awarded if the mini-game player achieves a defined level of success in the mini-game.

In addition to the actual mini-games, provisions are made to separately conduct and tape a plurality of substitute mini-games such that at least one substitute mini-game having a winner from each lottery jurisdiction is generated and stored. For example, at some time before broadcast of the game show, a plurality of the substitute mini-games are conducted and taped, wherein the player for each substitute mini-game is selected from a particular lottery jurisdiction. The substitute mini-games are conducted until a player from each lottery jurisdiction wins at least one mini-game. In the case where the primary lottery game is conducted in five different lottery jurisdictions, at least five substitute mini-games will be taped and stored, with each stored mini-game having a respective winner from one of the five lottery jurisdictions. In a desirable embodiment, a library of substitute mini-games will be taped and stored for each lottery jurisdiction.

The game show is conducted and taped until the actual mini-games are complete. Then, one or more of the winners in the actual mini-games are selected for play of the final bonus game and a chance to win an increased prize. In a particular embodiment, only a single winner is selected to compete in the bonus game of skill or chance, for example the player having the highest cumulative score in the mini-games. In alternate embodiments, the bonus game may pit one winner against another in a game of skill or chance.

The taped game show is prepared for television broadcast to all of the lottery jurisdictions. The broadcast intended for transmission to any of the lottery jurisdictions that does not have at least one winner of an actual mini-game in the original taped version of the game show is modified or individualized by inserting into the broadcast one of the substitute min-games having a winner from the respective lottery jurisdiction. In this manner, every lottery jurisdiction receives a transmitted broadcast having at least one contestant from that jurisdiction as a winner in at least one of the mini-games. For example, the game show may be prepared for broadcast in five different lottery jurisdictions A through E. However, there may not be a winner in any of the actual mini-games conducted during taping of the game show from jurisdiction C. In this scenario, when the game show is being prepared for broadcast in jurisdiction "C", one of the stored substitute mini-games having a winner from jurisdiction "C" is retrieved and placed into the broadcast for jurisdiction "C", but not in the broadcasts for jurisdictions A, B, D, and E. Thus, jurisdictions A, B, D, and E will receive the same broadcast game show, while jurisdiction C will receive a "modified" (e.g., individualized) broadcast. With this method, it is guaranteed that all at-home viewers will have the pleasure of watching one of their own residents, friend, or the like, from their lottery jurisdiction winning at least one of the mini-games. This will engender a comradery amongst viewers in the same jurisdiction and encourage increased at-home viewing in each jurisdiction.

In a particular embodiment, the substitute mini-game replaces one of the actual mini-games in the modified broadcast to one or more of the lottery jurisdictions. In another embodiment, the substitute mini-game is in addition to the actual mini-games in the modified broadcast.

Because the substitute mini-game was not actually a component of the initial game show, the winner in the substitute mini-game was not available for the final bonus game. In this regard, the substitute mini-game should be selected such that the winner of the substitute mini-game appears not to be eligible for the bonus game and does not affect selection of the winner from the actual mini-games that plays the final bonus game. Thus, the winner in the substitute mini-game should have a winning score (or other measure of success) that is lower than the winner selected form the actual mini-games to play the bonus game. A library of multiple substitute mini-games for each lottery jurisdiction is beneficial in this regard.

In a particular embodiment, the game show audience is composed of players of a primary lottery game conducted in the respective lottery jurisdictions that were randomly selected from a pool of the primary lottery game players generated in each of the respective lottery jurisdictions. The players of the primary lottery game may become entrants in the pool by accumulating game symbols from multiple plays of the primary lottery game in their respective lottery jurisdiction. For example, in a particular embodiment, for each play of the primary lottery game, the players are issued lottery tickets having a game symbol associated therewith, for example by being printed on the game tickets. In another embodiment, the lottery ticket may provide instructions to the player as to how to acquire a unique associated bonus game symbol via a website. For initial entry into a bonus game component of the primary lottery game, the method requires the players to collect a predefined set of different ones of the bonus game symbols for entry into a bonus game drawing. The method is not limited to any particular grouping technique or scheme relative to the bonus game symbols. For example, sets may be defined by color, theme, number, location on a board or matrix, and so forth, so long as the sets are readily understood and identified to the players.

Bonus game drawings are periodically conducted such that at least one of the players in the pool is selected as a winner in each bonus game drawing and becomes an audience member in the televised game show and eligible for selection as a contestant in one or more of the actual mini games. Thus, the lottery game is coordinated with the televised game show so that players or contestants in each of the mini-games are the selected winners in the bonus game drawings, and a prize is awarded to winning contestants in the televised game show.

In one embodiment, the mini-game players may be randomly drawn from the entirety of the audience such that there is no guarantee as to which jurisdictions the mini-game players will be drawn from.

In an alternate embodiment, each jurisdiction may have a defined group of bonus game winners within the audience, wherein at least one mini-game player is randomly drawn from each of the groups. With this embodiment, each jurisdiction has at least one contestant in the game show, which may promote at-home viewing of the show within each respective jurisdiction.

In addition, each jurisdiction may be assigned non-contestant audience member spots to be awarded or distributed within their jurisdiction as they see fit. For example, these audience spots may be randomly awarded to non-winning players of the bonus game component. The number of audience spots assigned to the jurisdictions may be a function of the respective jurisdictional participation in the primary lottery game, wherein jurisdictions having greater sales in the primary lottery game receive a greater number of audience spots. Thus, in these embodiments, the audience is composed of the non-contestant audience members and winners from the bonus game drawings, and the contestants in the televised game show are drawn from the bonus game winners present in the audience.

In an embodiment of the bonus game, the players may be awarded a defined number of entries in the bonus game drawing, for example three entries. The defined number of entries may be multiplied as a function of a multiplier symbol earned by the player. This multiplier symbol may be earned in a component of the bonus game (e.g., a sub-game or drawing), or "purchased" by the player, for example with loyalty or club points earned by the player. In an alternate embodiment, the multiplier symbol is earned by the player in a separately conducted second primary lottery game that is linked to the first primary game through the multiplier symbol or other prize or odds enhancement mechanism. This embodiment may serve to generate increased sales in the second primary lottery game.

The method may include providing players with a bonus game board that tracks status of the bonus game symbols acquired by the player. This game or status board may be a virtual game board provided to the players via a website accessible by the players. This embodiment lends itself well to promoting a game theme, such as a MONOPOLY game theme, wherein the bonus game symbols identify sets of property locations on the MONOPOLY game board. The players may have individual player accounts that are accessible by the players via the website, wherein the accounts include the player's virtual game board updated with a status of the bonus game symbols accumulated by the player, as well as any other aspect of the player's involvement with the primary lottery game or bonus game.

It should be appreciated that the present game method is not limited to any particular type of first or second primary lottery games. In one embodiment, the primary game is a lottery draw game (e.g., a "Pick-4" game wherein players attempt to match selected player indicia with four indicia randomly drawn from a field of indicia) and the lottery game tickets are lottery draw tickets having at least one entry into the draw game. These tickets may be purchased by players at an authorized lottery retail establishment, via the Internet, and so forth. The lottery tickets have one or more of the first bonus game symbols provided thereon (or associated therewith), such as an Ace-of-spades where the first game symbols are divided into groups of playing cards and the players are required to collect a predefined set of cards for initial entry into the bonus game.

If a second primary lottery game is implemented, for example to provide multiplier factors or other prize/odds enhancement symbols related to the bonus game, such second primary game may also be a lottery game, including another independently conducted draw game with its own prize structure. In a particular embodiment, however, the second primary game is an instant ticket lottery game and the second game tickets are instant lottery tickets having a second bonus game symbol provided thereon that is visually linked to a particular one of the predefined sets of first bonus symbols. For example, the bonus symbol may be a "3× multiplier for ♠", wherein a player's initial entry into the bonus game with a particular predefined set of spades is enhanced by a factor of three (e.g., an initial 10 entries becomes 30 entries).

BRIEF DESCRIPTION OF THE DRAWINGS

A full and enabling description of the present invention is provided herein, with reference to particular embodiments depicted in the attached drawings and described below. Certain of the drawings and related description include depictions or reference to characters, images, trademarks, logos, and the like, associated with the well-known board game MONOPOLY. "MONOPOLY" and the related graphics in the drawings (including all names, characters, images, trademarks and logos) are protected by trademark, copyrights, and other Intellectual Property rights owned by Hasbro.

BRIEF DESCRIPTION OF THE DRAWINGS

Figure 1:
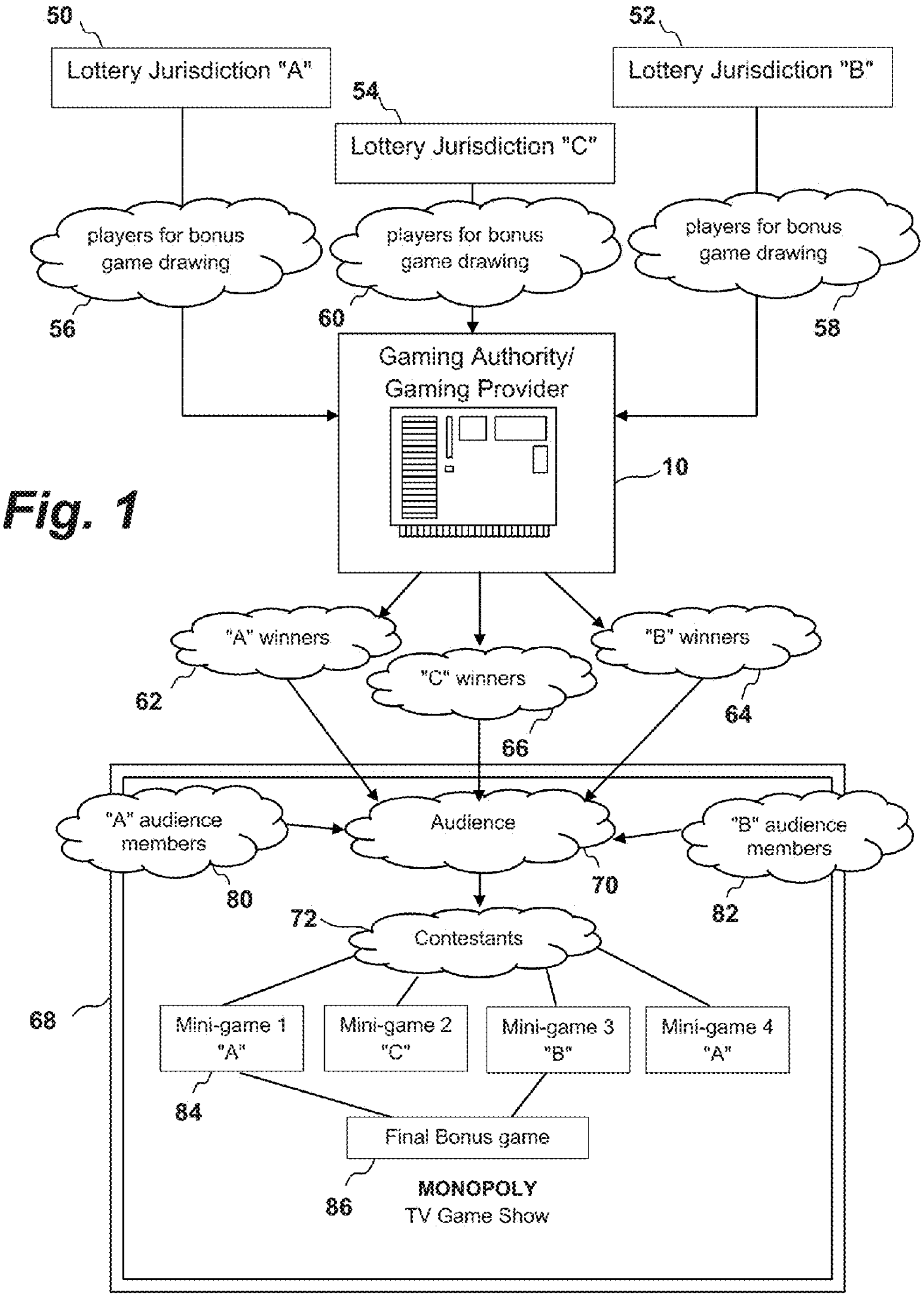
Figure 2:
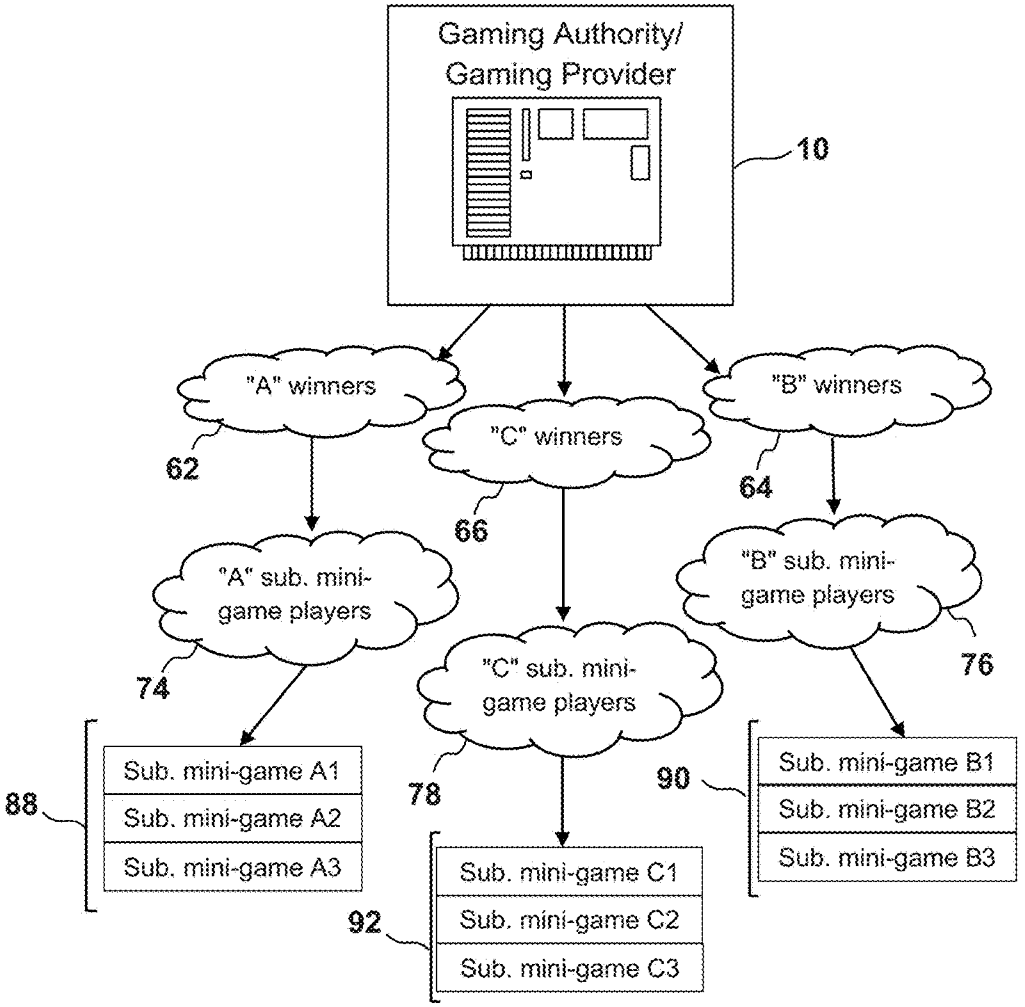
Figure 3A:
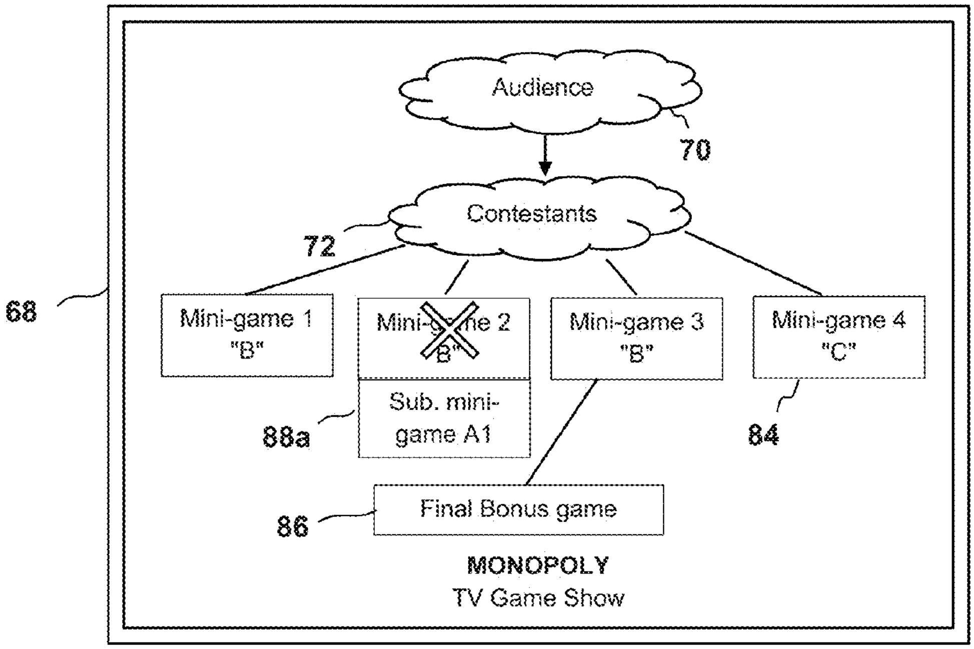
Figure 3B:
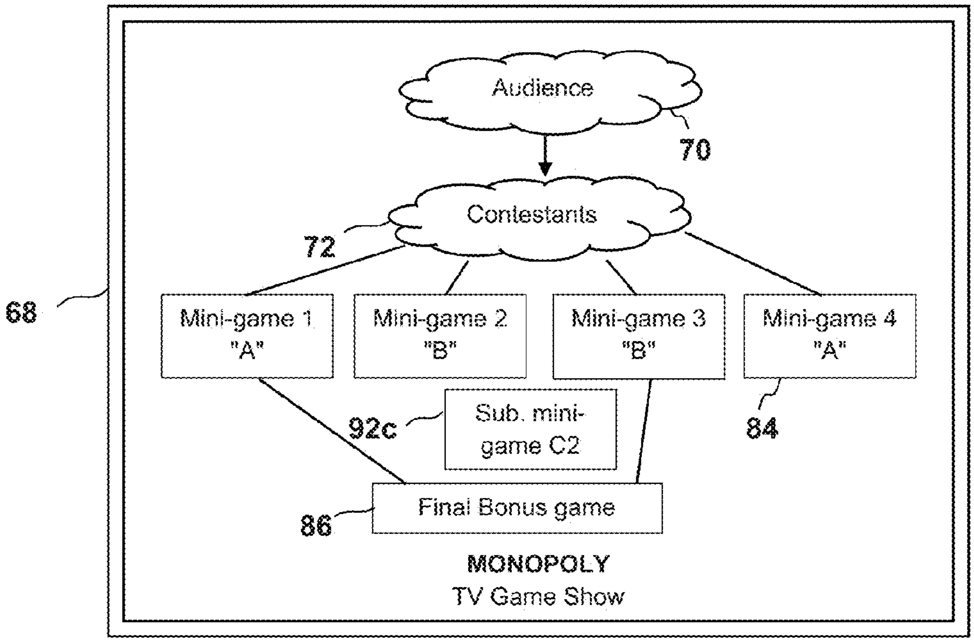
Figure 4:
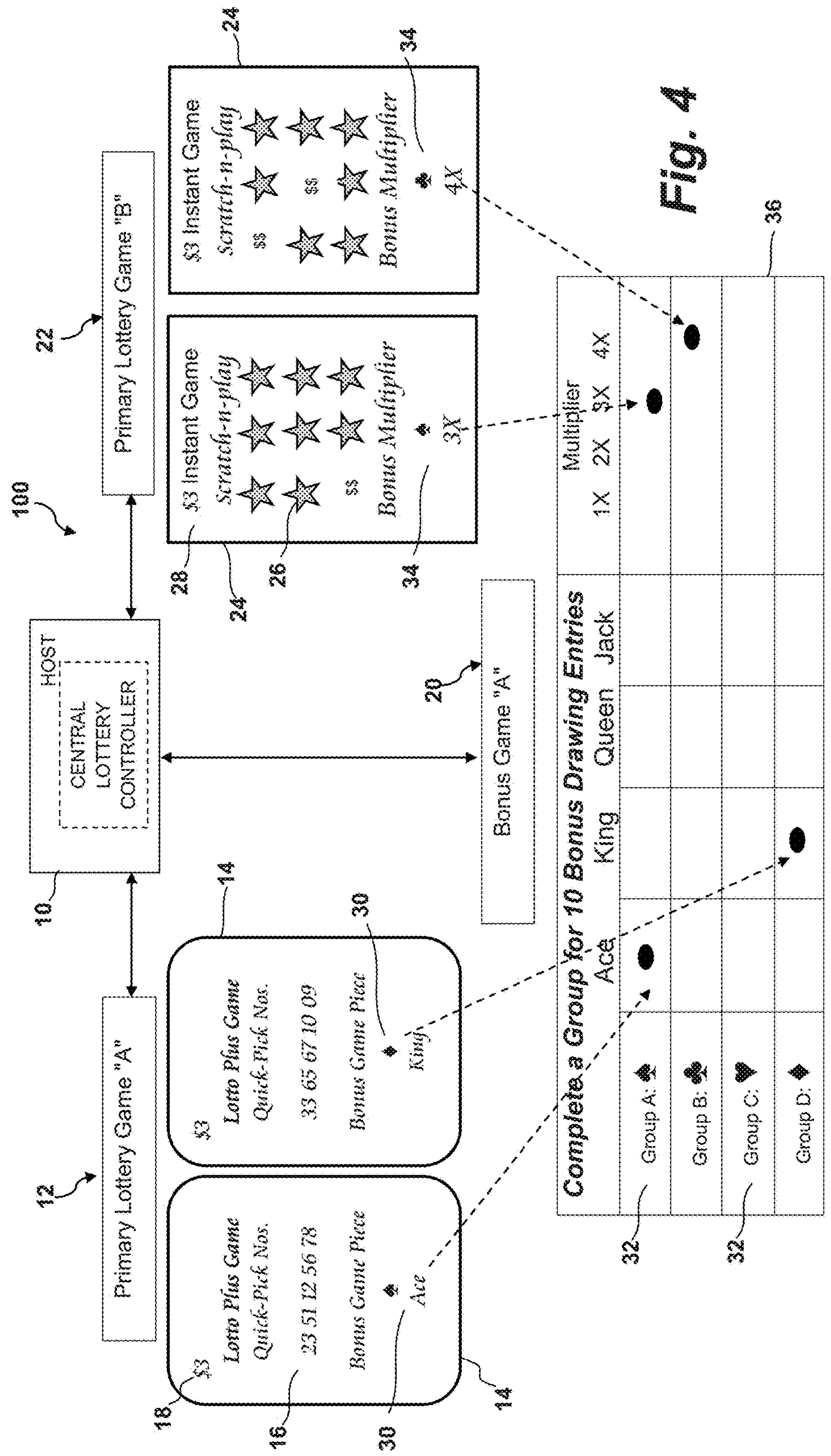
Figure 5:
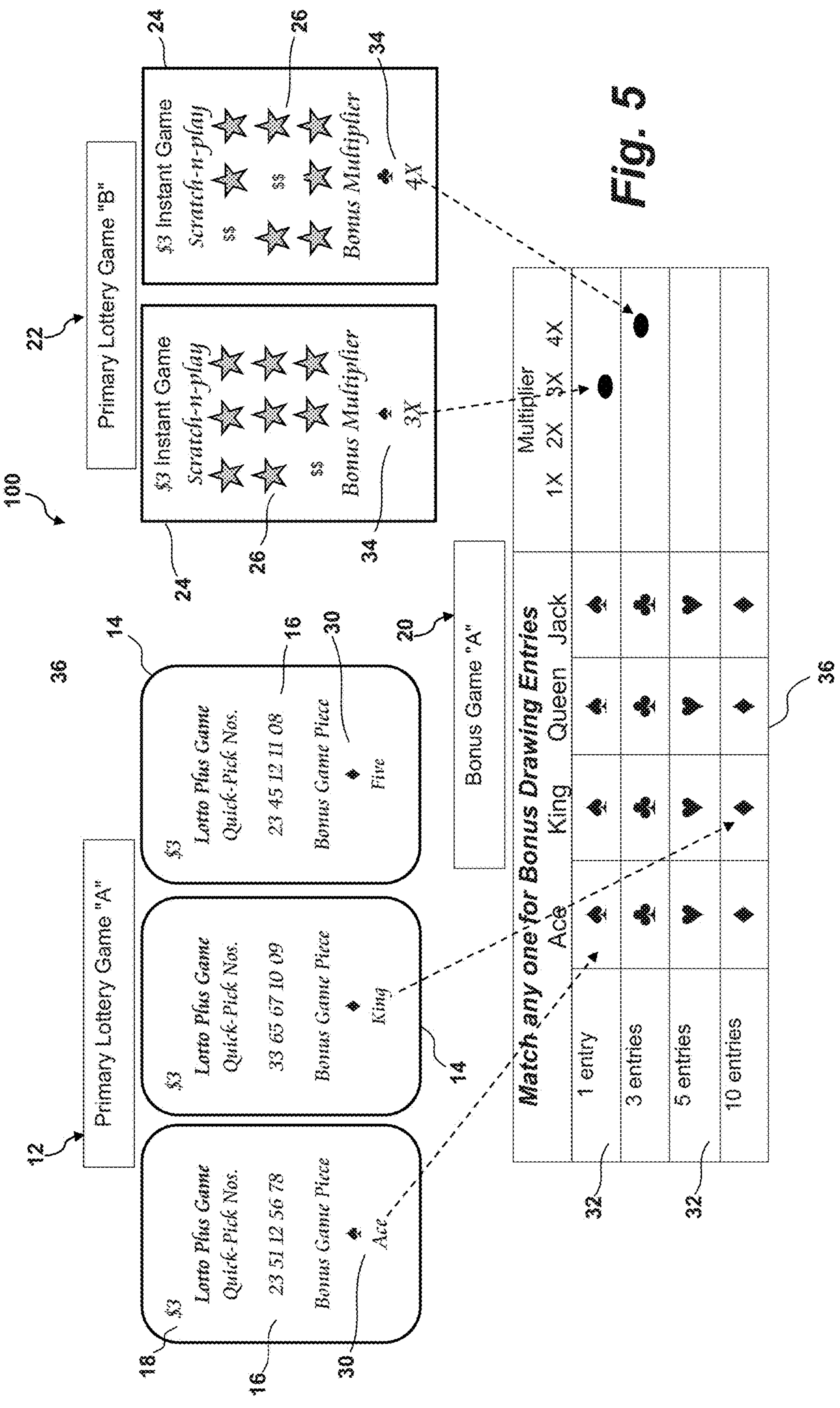
Figure 6A:
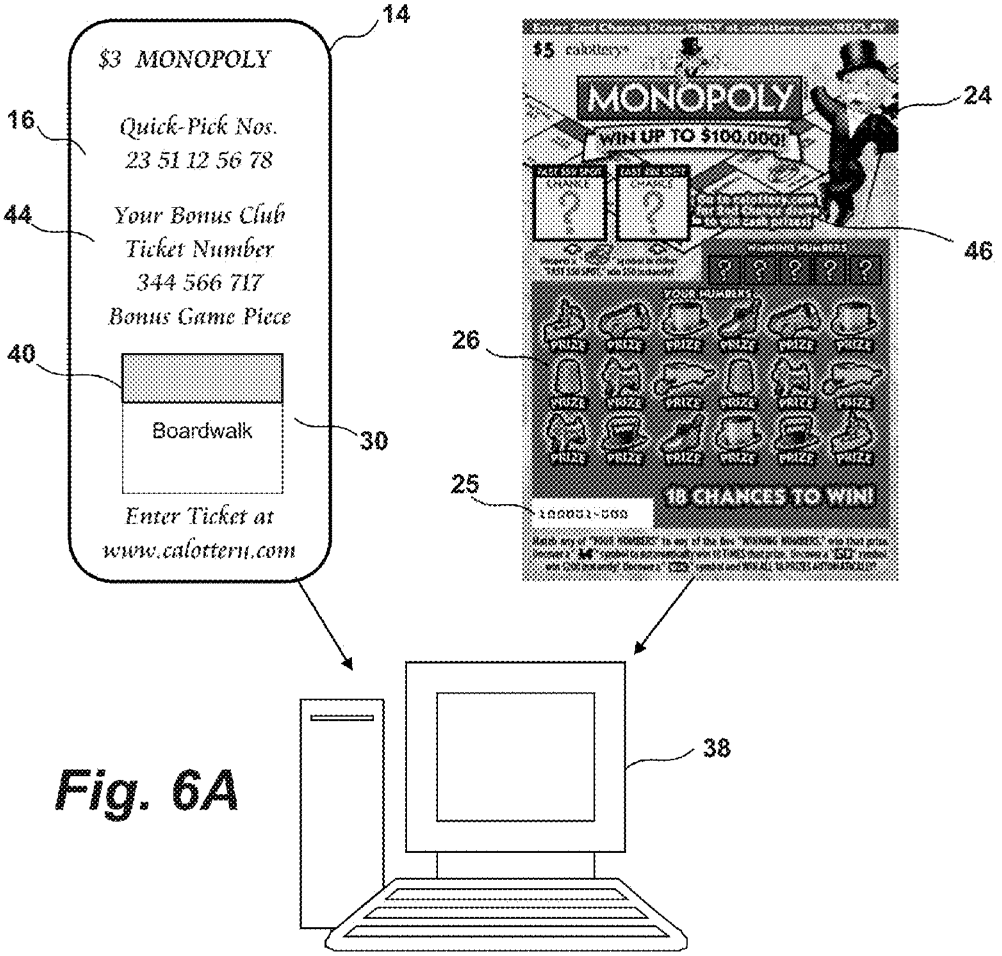
Figure 6B:
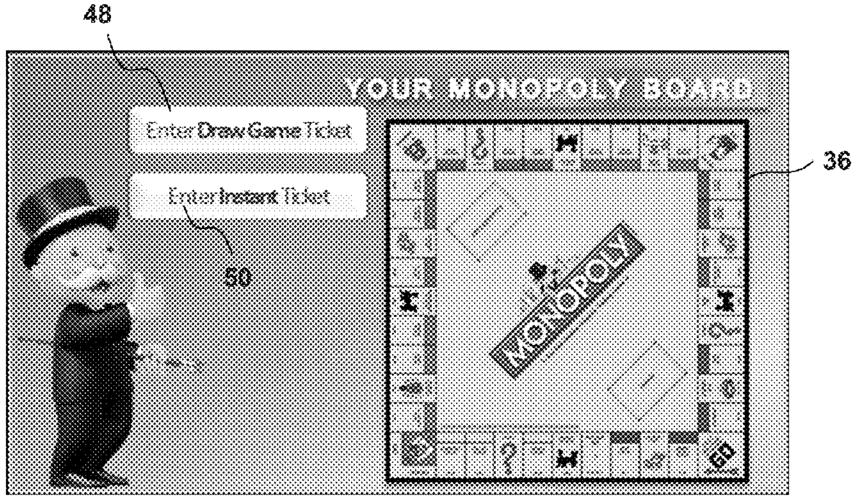
Figure 6C:
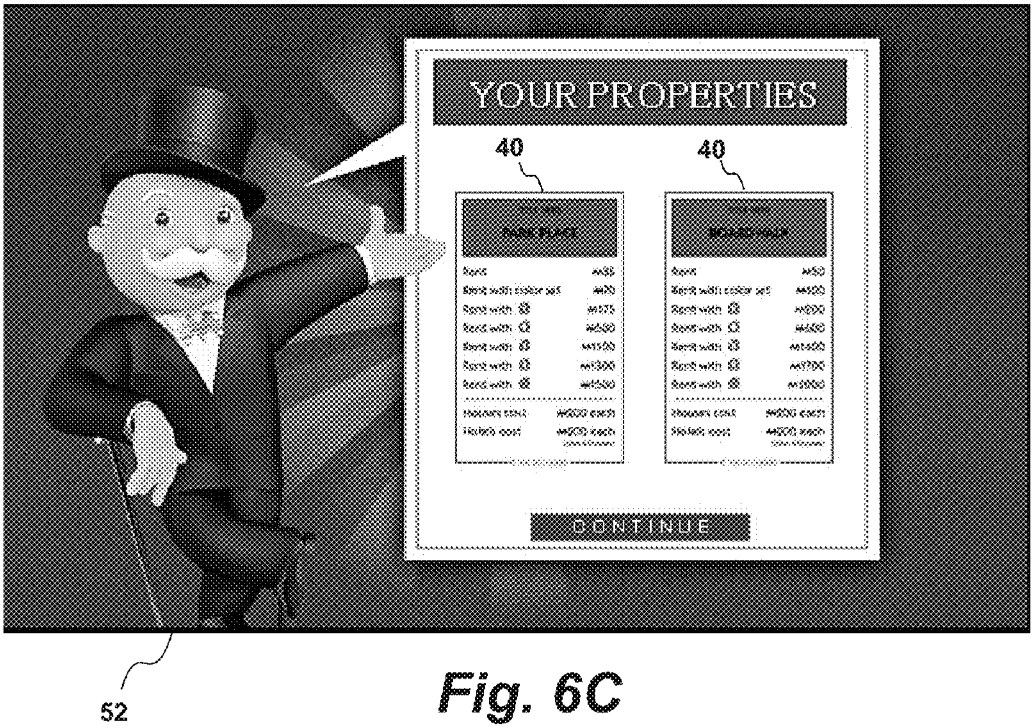
Figure 6D:
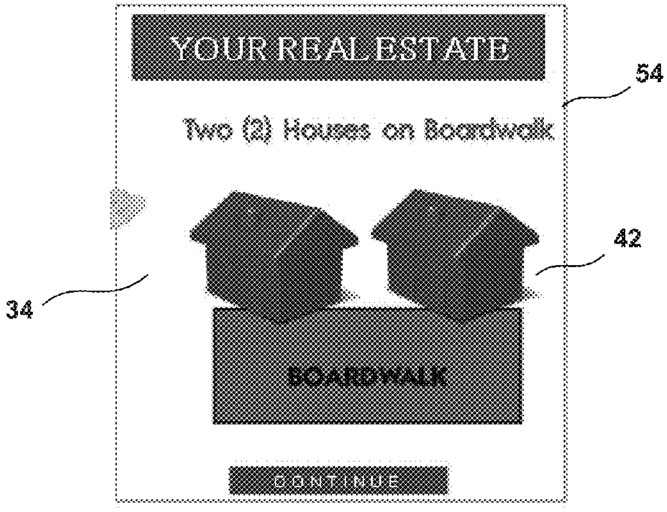
Figure 6E:
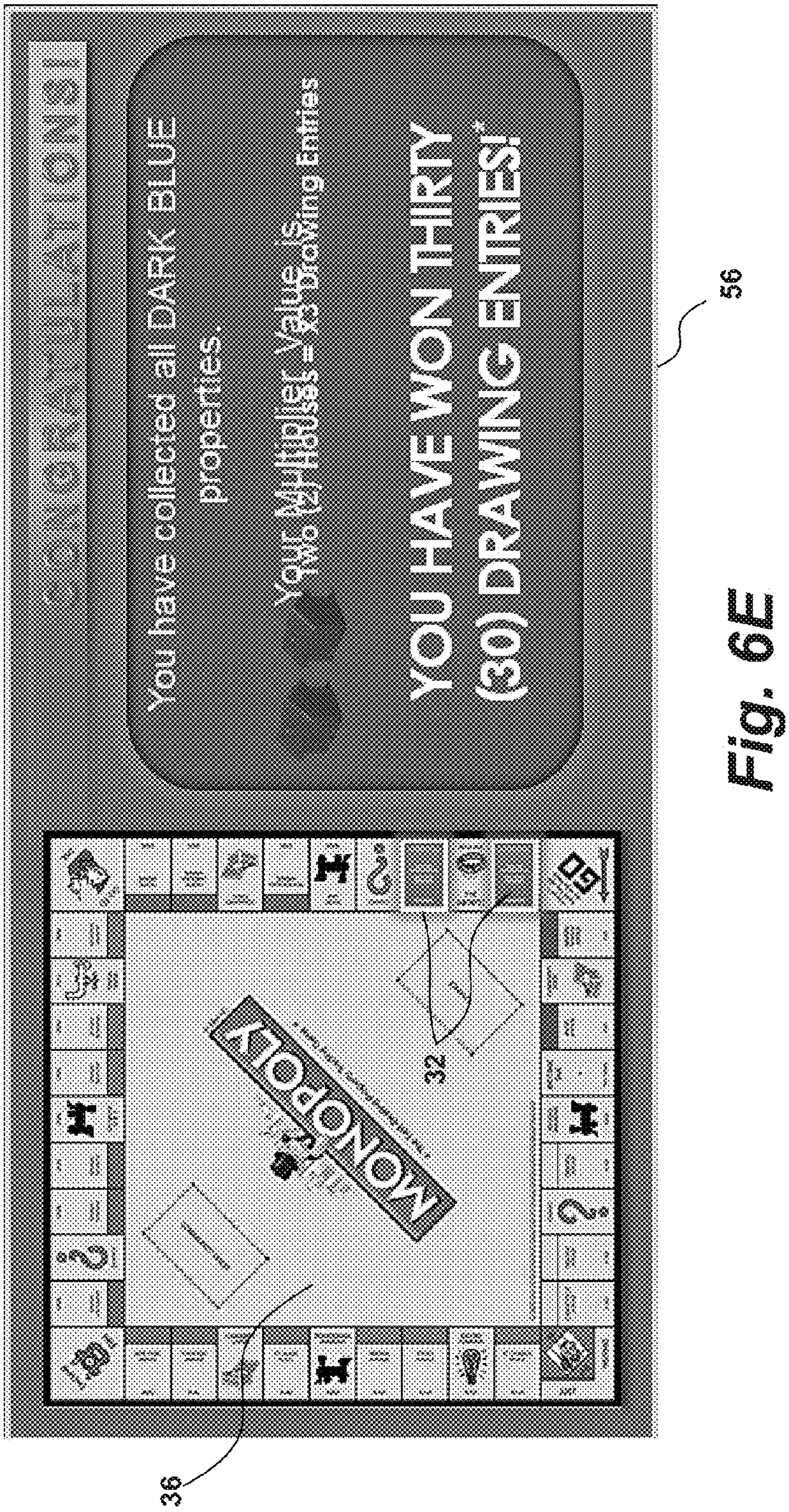
Figure 7:
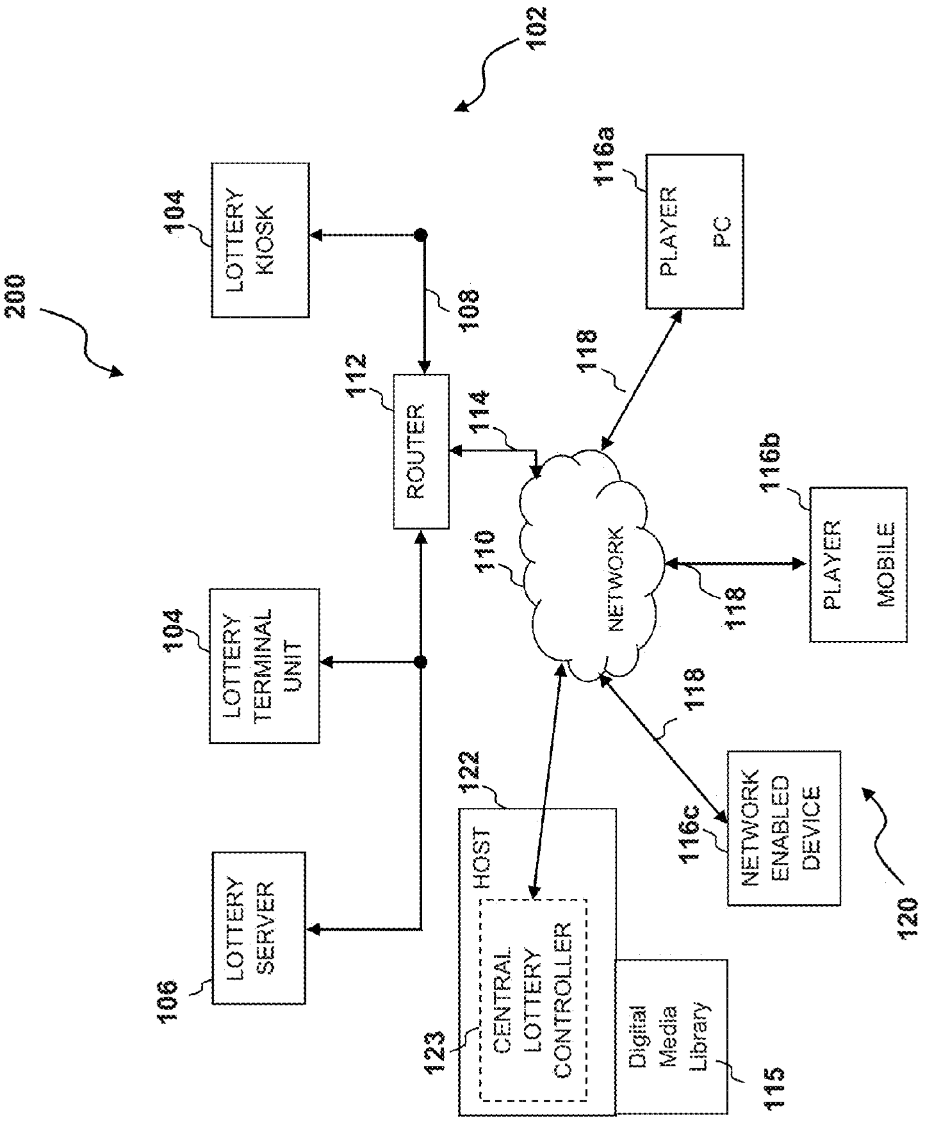

FIG. 1 is a diagram illustration of a system and method for conducting a lottery bonus game coordinated with a televised game show in accordance with principals of the invention;

FIG. 2 is a diagram illustration of aspects of the system and method of FIG. 1;

FIG. 3A is a diagram illustration of an embodiment for individualizing a broadcast of a televised game show for a lottery jurisdiction;

FIG. 3B is a diagram illustration of an alternative embodiment for individualizing a broadcast of a televised game show for a lottery jurisdiction;

FIG. 4 is a diagram illustration of a system and method with components for primary lottery games and a bonus game in accordance with principals of the invention;

FIG. 5 is a diagram illustration of an alternative embodiment of a system and method in accordance with aspects of the invention;

FIG. 6A is an illustration of game components, including lottery tickets and game board, that may be used in an embodiment in accordance with the invention;

FIGS. 6B through 6E are illustrations of additional game components that may be used with the embodiment of FIG. 5A; and FIG. 7 is a block diagram view of a computer implemented system that may be used to practice the method and system of the present invention;

DETAILED DESCRIPTION

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

In general, the present disclosure is directed to computer implemented methods and systems for conducting a second chance or bonus game component of a primary lottery game that is coordinated with a televised game show. For sake of example only, the following discussion relates to embodiments of the invention drawn to primary lottery games and bonus games sponsored by state or other jurisdictional authorities. It should be appreciated, however, that the system and method are just as applicable to a bonus game component linked to any manner of primary games, such as multiple primary games conducted within a gaming establishment (e.g., a casino) for patrons of such establishment.

As their name implies, second chance or bonus games are a means for a game player to win a prize with an apparent losing ticket from an initial or primary game. Traditionally, these bonus games are linked to non-winning instant (scratch-off) game tickets, and certain embodiments described herein relate to this scenario. It should be appreciated, however, that the present method and system are not limited to any particular type of primary lottery game, and may include, for example, a primary draw-type lottery game. In addition, the invention is not limited to non-winning tickets in the primary lottery game. Winning tickets may also be entered into the bonus game component.

Referring to FIG. 1, the bonus game component of a primary lottery game is coordinated with a televised game show 68 wherein contestants compete in a series of mini-games 84 for the chance to play in a final bonus game 86. The particular type of mini-game 84 or final bonus game 86 is not a limiting feature. These games may be games of skill or chance. A single player may compete against the house in each mini-game 84 or final bonus game 86. Alternatively, multiple players may compete against each other in the mini-games 84 or final bonus game 86. Each mini-game 84 may have a prize associated therewith that is awarded if the mini-game player achieves a defined level of success in the mini-game.

The lottery bonus game is coordinated with the game show 68 to the extent that the game show 68 is essentially the venue in which the bonus game is finally concluded. The televised game show may be produced with the assistance of the gaming authority, game provider, or any other entity associated with the primary lottery game. For example, on behalf of one or more lottery jurisdictions, a game provider (e.g., provides the primary lottery game to multiple jurisdictions) may be partnered with a game show producer on a local or national level, and the game show may be televised at a local or national level. The game provider may have in-house production capabilities for producing the game show.

Referring again to the embodiment of FIG. 1, three separate lottery jurisdictions 50 (Jurisdiction A), 52 (Jurisdiction B), and 54 (Jurisdiction C) are depicted. These jurisdictions 50-54 may be multiple states, or defined geographical regions within a single state, or regions falling within the same governmental gaming regulations, or regions defined solely by the gaming provider or gaming authority, and so forth. Each jurisdiction 50-52 conducts its own primary lottery game and bonus game drawings, as discussed in greater detail below. Thus, each jurisdiction 50, 52, and 54 generates a respective pool 56, 58, 60 of players entered into a bonus game drawing. In a particular embodiment, players qualify for this pool by collecting a defined set of bonus game symbols in a primary lottery game, as described in greater detail below.

It should be readily appreciated that the gaming authority may employ, contract with, or otherwise cooperate with any other party or entity to implement the present method embodiments on behalf of the gaming authority within their respective jurisdiction, such as a game provider that prints lottery tickets or renders information/database management services to the gaming authority.

Periodically, a bonus game drawing is conducted wherein one or more winners 62, 64, 66 are selected (e.g., randomly drawn) from the pools 56, 58, 60. For example, in the embodiment of FIG. 1, multiple winners from jurisdiction "A" define a group of "A" winners 62 that are eligible to become contestants in the televised game show. Likewise, multiple winners from jurisdictions "B" and "C" are selected and define groups of winners 64 and 66, respectively, which are eligible to become contestants in the game show. At least one bonus game drawing is conducted in each jurisdiction before each of the televised game shows.

Each jurisdiction may be assigned a minimum number of winners in the groups 62, 64, and 66 (e.g. 100 hundred winners from each jurisdiction). Other factors may warrant assigning certain of the jurisdictions 50, 52, and 54 a greater number of winners, such as volume of participation by players within the jurisdiction that participated in the primary game, geographic size of the jurisdiction, revenue generated in the jurisdiction, and so forth. It should be understood that a respective pool 56, 58, and 60, or group of winners 62, 64, 66, may be one or more players.

In the embodiment of FIG. 1, the contestants 72 in the mini-games 84 of the televised game show 68 are drawn from an audience 70 assigned to the show. As indicated by the directional arrows in FIG. 1, the audience is, in whole or in part, composed of the groups of winners 62, 64, and 66 from the bonus game drawings. The mini-game contestants 72 may then be randomly drawn from the entirety of the audience 70 such that no one jurisdiction is guaranteed a contestant 72 in any of the mini-games 84 in the game show 68.

Still referring to FIG. 1, in an alternate embodiment, the groups of winners 62, 64, and 66 are still assigned to the audience 70. However, at least one game show contestant 72 is then randomly selected from each group 62, 64, 66 for at least one of the mini-games 84 such that each participating jurisdiction has at least one contestant in the show. For example, if the show has six mini-games 84, at least one contestant 72 is drawn from each of the groups 62, 64, 66 so that each jurisdiction A, B, and C is guaranteed at least one participant in the mini-games 84. It may be that the mini-games 84 are divided equally between the groups 62, 64, 66 so that two contestants 72 are drawn from each group 62, 64, 66. In this embodiment, the identity of the particular groups 62, 64, and 66 may be maintained in the audience. For example, each group may have an assigned seating section, or may wear respective identifying clothing, or the like. With this embodiment, each jurisdiction has at least one contestant in the show, which may promote at-home viewing of the show within each respective jurisdiction.

FIG. 1 depicts that the contestants 72 are drawn from the audience 70. In an alternate embodiment, the contestant selection process may be done completely outside of and before the game show, and may be conducted by a drawing held by the gaming authority/game provider in a separate event.

In addition, referring to FIG. 1, each jurisdiction may be assigned non-contestant audience member spots 80, 82 to be awarded or distributed within their jurisdiction. For example, these audience spots 80, 82 may be randomly awarded to non-winning players of the bonus game component. The number of audience spots 80, 82 assigned to the jurisdictions may be a function of the respective jurisdictional participation in the primary lottery game, wherein jurisdictions having greater sales in the primary lottery game receive a greater number of audience spots 80, 82. Thus, in the embodiment of FIG. 1, the audience 70 is composed of the non-contestant audience members 80, 82 and winners 74, 76, from the bonus game drawings, and the contestants in the televised game show are drawn from the bonus game winners present in the audience. In an alternate embodiment, the audience 70 may be composed of the non-contestant audience members 80, 82, and the contestants in the game show are pre-selected.

Referring to FIGS. 1 through 3B in general, in addition to the actual mini-games 84, provisions are made to separately conduct and tape a plurality of substitute mini-games 88, 90, 92 (FIG. 2). These substitute mini-games may be conducted and taped before or after taping of the televised game show 68. Referring to FIG. 2, a group or library of substitute mini-games 88, 90, 92 is generated for each lottery jurisdiction that participates in the primary lottery game and bonus game component that culminates in the televised game show 68. Players for these substitute mini-games 88, 90, 92 are selected from the groups of winners 62, 64, 66 for the respective lottery jurisdictions A, B, C. For example, referring to FIG. 2, players 74 for the substitute mini-games 88 associated with lottery jurisdiction A are selected randomly (or by any other means) from the group of winners 62 from lottery jurisdiction A. Likewise, players 76 for the substitute mini-games 90 associated with lottery jurisdiction B are selected from the B group of winners 64, and players 78 for the substitute mini-games 92 are selected from the C group of winners 66.

The substitute mini-games 88, 90, 92 are conducted so as to tape and store at least one substitute mini-game having a winner from each lottery jurisdiction A, B, C. For example, at some time before broadcast of the game show 68, a plurality of the mini-games 88, 90, 92 are conducted until a player from each lottery jurisdiction wins (according to a defined "win" criteria) at least one mini-game. In the case where the primary lottery game is conducted in five different lottery jurisdictions, at least five substitute mini-games will be taped and stored, with each stored substitute mini-game having a respective winner from one of the five lottery jurisdictions. In a desirable embodiment, a library 88, 90, 92 of substitute mini-games will be taped and stored for each lottery jurisdiction.

Referring again to FIG. 1, the televised game show 68 is conducted until the actual mini-games 84 are complete. Then, one or more of the winners in the actual mini-games 84 are selected for play of the final bonus game 86 and a chance to win an increased prize. In a particular embodiment, only a single mini-game winner is selected to compete in the bonus game of skill or chance, for example the player having the highest cumulative score in the mini-games 84. In alternate embodiments, the bonus game 86 may pit one winner against another in a game of skill or chance.

The taped, televised game show 68 is prepared for broadcast to all of the lottery jurisdictions A, B, C, for example via any pre-arranged broadcast scheme involving studios, affiliates, and the like. For example, lottery jurisdiction A may correspond to the state of South Carolina, lottery jurisdiction B may correspond to the state of Georgia, and lottery jurisdiction C may correspond to the state of Florida. The televised game show 68 will be broadcast to these three geographically defined lottery jurisdictions via any suitable broadcast scheme.

An aspect of the method is that the broadcast intended for each individual lottery jurisdiction A, B, C has at least one winner of a mini-game 84 from the respective jurisdiction. For example, referring to FIG. 1, four mini-games 84 are conducted. Mini-games 1 and 4 were won by a player from lottery jurisdiction A, mini-game 2 was won by a player from lottery jurisdiction C, and mini-game 2 was won by a player from lottery jurisdiction C. The contestants from mini-games 1 and 3 compete against each other in the final bonus game 86. Thus, in this particular game show 68, each jurisdiction A, B, C has at least one winner of a mini-game 84, and the same version of the game show 68 (e.g., the original taping) can be broadcast to each jurisdiction A, B, C.

FIG. 3A depicts a version of the original game show 68 wherein the mini-games 84 are all won by players from lottery jurisdiction B or C. Thus, although this version can be broadcast to lottery jurisdictions B and C, it is not suitable for broadcast to lottery jurisdiction A. FIG. 3A depicts modification of the broadcast of game show 68 intended for lottery jurisdiction A by insertion of one of the stored substitute mini-games 88*a* associated with jurisdiction A (with a player from jurisdiction A winning the mini-game) in place of the actual mini-game 2. Thus, the original version of the game show 68 is modified or individualized for lottery jurisdiction A. Jurisdictions B and C are transmitted the original (unmodified) version of the game show 68, and jurisdiction A receives the modified version. Alternatively, each jurisdiction A, B, C could receive the modified version since the modified version has a mini-game winner from each jurisdiction. Regardless, every lottery jurisdiction receives a transmitted broadcast having at least one contestant from that jurisdiction as a winner in at least one of the mini-games 84. With this method, it is guaranteed that all at-home viewers will have the pleasure of watching one of their own residents, friend, or the like, from their lottery jurisdiction winning at least one of the mini-games. This will engender a comradery amongst viewers in the same jurisdiction and encourage increased at-home viewing in each jurisdiction.

It should be appreciated that the broadcast received by one jurisdiction A, B, C need not have a mini-game winner from the other jurisdictions. For example, the game show may be prepared for broadcast in five different lottery jurisdictions A through E. However, there may not be a winner in any of the actual mini-games conducted during taping of the game show from jurisdiction C and D. In this scenario, when the game show is prepared for broadcast in jurisdiction "C", one of the stored substitute mini-games having a winner from jurisdiction "C" is retrieved and placed into the broadcast for jurisdiction "C". Likewise, one of the stored substitute mini-games having a winner from jurisdiction "D" is retrieved and placed into the broadcast for jurisdiction "D". Thus, jurisdiction C will receive a modified version of the game show 68 with no mini-game winner from jurisdiction D, and jurisdiction D will receive a modified version of the game show 68 with no mini-game winner from jurisdiction C. Jurisdictions A, B, and E may all receive the original taped version of the game show 68.

In the embodiment depicted in FIG. 3B, there is no winner of a mini-game 84 from jurisdiction C in the original game show 68. The broadcast intended for jurisdiction C is thus modified by the addition of one of the stored substitute mini-games 92*c* from the library of stored mini-games 92 associated with lottery jurisdiction C. Thus, the modified version of the game show 68 for jurisdiction C contains five mini-games (the four original mini-games 84 and the additional substitute mini-game 92*c*), while jurisdictions A and B may receive the tape of the original game show 68 having only four mini-games 84.

Referring to FIGS. 3A and 3B, it should be appreciated that because the substitute mini-games 88*a*, 92*c* were not actually a component of the initial game show 68, the winner in the substitute mini-games 88*a*, 92*c* was not available for the final bonus game. In this regard, the substitute mini-games 88*a*, 92*c* should be selected such that the winner of these substitute mini-games appears not to be eligible for the bonus game and does not affect selection of the winner from the actual mini-games 84 that plays the final bonus game 86. Thus, the winner in the substitute mini-game 88*a*, 92*c* should have a winning score (or other measure of success) that is lower than the winner selected form the actual mini-games 84 to play the bonus game 86. A library of multiple substitute mini-games for each lottery jurisdiction is beneficial in this regard.

Referring to FIGS. 4 and 5, aspects of an associated lottery game method and associated implementing system 100 are illustrated whereby players are eventually qualified for participation in the televised game show 68 discussed above. The method and system are hosted by a gaming or lottery authority (e.g., a sponsoring state or other jurisdictional entity) through a host controller 10, which may be any hardware/software architecture necessary for conducting the games in a given jurisdictional area. A first primary game 12 ("Primary Lottery Game A") is depicted as a lottery draw game wherein players are issued first game tickets or entries 14 in the form of lottery tickets for play of the lottery draw game in a conventional manner. For example, the lottery tickets 14 include any manner of game indicia 16, 18 for play of the draw game, including price of the ticket, the player's game numbers, bar codes, security features, and the like. The type or manner of game indicia is not limiting factor of the invention and includes any indicia necessary or desired to conduct the first primary game 12.

A bonus game 20 is established that is played separate from the first primary game 12. The bonus game 20 has its own set of rules and prize structure and is generally conducted completely independent of the primary lottery game. Various types of second chance or bonus games 20 are well known in the lottery industry, and any one or combination of these games may be utilized in the present invention. In the embodiment depicted in FIG. 4, the bonus game 20 is referenced as a "drawing" type of game (i.e., a raffle). Players are granted entries or tickets into a random drawing wherein, for each drawing, at least one winning selections is drawn from the pool of entries.

Still referring to the embodiment of FIG. 4, first bonus game symbols 30 are associated with the lottery game tickets 14, for example by being printed on the game tickets as depicted in FIG. 4. In another embodiment, the game tickets 14 may provide instructions to the player as to how to acquire a unique associated bonus game symbol 30 that is revealed to the player via a website. The players are required to collect a predefined set or grouping (the terms "sets" and "groups" are used interchangeably herein) of different ones of the bonus game symbols 30 before receiving one or more initial entries into the bonus game 20. A predefined set includes a set of one game symbol 30 or a set of a plurality of game symbols 30. As mentioned, the method is not limited to any particular grouping technique or scheme. For example, sets may be defined by color, theme, number, location on a board or matrix, and so forth, so long as the sets are readily understood and identified to the players. In the embodiment of FIG. 4, the predefined sets 32 are face cards from a conventional playing deck. Group A corresponds to: A♠, K♠, Q♠, and J♠. Group B corresponds to: A♣, K♣, Q♣, and J♣. Group C corresponds to: A♥, K♥, Q♥, and J♥. Group D corresponds to: A♦, K♦, Q♦, and J♦. In the embodiment of FIG. 4, in order to qualify for play of the bonus game 20, a player would need to satisfy any one of these groups with the game symbols 30 they have accumulated from purchase of first game tickets 14.

The game symbols 30 on the game tickets 14 of FIG. 4 are the A♠ and K♦, respectively. It should be appreciated that the game symbols 30 could be cards or items that are not within any of the predefined groups 32. For example, the game symbols 30 on game tickets 14 may be 10♠ or 8♣, which are not face cards belonging to any one of the predefined groups 32 and thus have no value in the bonus game 20.

If the one of the groups 32 are satisfied by the player's accumulation of game symbols 30, then the player is entered into the bonus game 20 and is granted a defined number of entries into the bonus game drawing. For example, in the embodiment of FIG. 4, the player is granted 10 entries into the bonus game drawing 20 for each group 32 collected by the player.

The players may enter their primary lottery game tickets 14 into the bonus game program via a website maintained by the gaming authority. It is not a requirement that only non-winning tickets 14 can be entered. For example, all tickets 14 from the primary lottery game may be played, including winning tickets. The tickets are "entered" in the sense that each game ticket or entry 14 is uniquely identified by a code or other means that the player provides to the game authority or administrator, for example via a website maintained by the game authority or in person at an authorized game or lottery location. Once verified, the ticket 14 is entered into the bonus game 20 and the game symbol 30 associated with each tickets are recorded or credited in the player's account.

A particular embodiment of the primary lottery game may include the linking of a second primary lottery game to enhance the player's odds of success or prize in the bonus game. This embodiment is also illustrated in FIG. 4, wherein a second primary game 22 ("Primary Lottery Game B") is established wherein players are issued second game tickets or entries 24 for play of the second primary game. In the embodiment depicted in FIG. 4, the second primary game 22 is a conventional instant scratch-off lottery game wherein players are issued second game tickets 24 in the form of conventional scratch-off lottery tickets having any manner of game indicia 26, 28 for play of the instant games, including price of the ticket, game symbols underlying a scratch-off coating, bar codes, security features, and the like. Conventional lottery scratch-off tickets are well known in the art and need not be described in detail herein.

The second game tickets 24 are "linked" to the bonus game 20 for the first primary game 22 such that players increase their chance of success in the bonus game 20 by entering the second game tickets 24 (winning or non-winning) into the bonus game 20. The primary games 12, 22 and bonus game 20 are conducted such that (i) play of the first primary game 12 does not require play of the bonus game 20 or the second primary game 22, (ii) play of the second primary game 22 does not require play of the first primary game 12 or the bonus game 20, and (iii) play of the bonus game 20 requires play of the first primary game 12 but not the second primary game 22. Thus, the gate to the bonus game 20 is play of the first primary game 12. The player cannot enter the bonus game 20 simply by playing the second primary game 22. Play of the second primary game 22 may, however, increases the player's likelihood of success or enhance a prize in the bonus game 20 by various means. For example, in one embodiment described in greater detail below, entry of game tickets 24 from the second primary game 22 may increase the number entries a player is granted in the bonus draw game 20, or increase a prize awarded in the bonus game 20, or increase the number of bonus games 20 the player is eligible to play, and so forth.

A second type of bonus game symbol 34 is associated with (e.g., printed on or accessible via a website) on the second game tickets 24. The second bonus game symbols 34 are visually linked to a particular one of the predefined groupings 32 of first bonus symbols to the extent that a player can readily visually associate the symbol 34 with a particular group 32. For example, referring to the embodiment of FIG. 4, the second bonus game symbols 34 printed on the second game tickets 24 are "♠3×" and "♣4×", respectively. A player can readily appreciate that "♠3×" is a multiplier (factor of 3) associated with the Group A, and that "♣4×" is a multiplier (factor of 4) associated with Group B.

The player's initial entry into the bonus game 20 (granted upon accumulation of one or more of the predefined sets 32 of first bonus game symbols) may be enhanced by one or more of the second bonus game symbols 34 accumulated by the player that are linked to the respective predefined set 32 of first bonus game symbols 30. For example, referring to FIG. 4, the bonus game 20 is a drawing event wherein a "winner" is randomly selected from a pool of entries, the winner receiving a prize award of some value. The player is granted 10 initial entries into the drawing upon accumulation of one of the predefined sets 32 of first bonus game symbols 30. The player has also accumulated a 3× multiplier for Group A and a 4× multiplier for Group B. If the player satisfies Group A, then the 10 initial entries are increased to 30. If the player satisfies Group B, then the 10 initial entries are increased to 40.

In certain embodiments, the player can accumulate multiple sets 32 of bonus game symbols between bonus game drawings, wherein the player's number of entries in the next scheduled bonus game 20 is the cumulative total from all of the accumulated sets. For example, if the player accumulates Group A and Group B, then he is granted 20 initial entries in the bonus game 20. These initial entries may be increased by any second bonus game symbols 34 acquired by the player that relate to Group A or Group B.

The embodiment of a multiplier that increases the player's odds of winning is only one example of an enhancement to play of the bonus game 20. In another embodiment, the second bonus game symbol 34 may increase the prize award in the bonus game 20 resulting from the player becoming a winning contestant in the televised game show. For example, a multiplier of 3× may apply to a prize award from the game show of $10,000, resulting in a final prize of $30,000. In still another embodiment, the second bonus game symbol 34 may identify an "add-on" prize that is in addition to the bonus game entries or bonus game price, such as a $500 shopping spree, and so forth. It should be appreciated that the type of enhancement provided by the second bonus game symbols 34 can vary within the scope and spirit of the invention.

FIG. 5 depicts and embodiment 100 of a method and associated system that is similar in many respects to the embodiment of FIG. 4. In this embodiment, however, qualification for entry into the bonus game 20 only requires one particular bonus game symbol 30. In other words, the predefined sets 32 include one or more game symbols 30. For example, the player has accumulated three first game symbols 30 from the first primary lottery game 12: ♠A, ♦K, and ♦5. The ♠A entitles the player to 1 entry in the bonus game 20, and the ♦K entitles the player to 10 entries in the bonus game. The ♦5 does not match one of the predefined sets 32 and has no value in the bonus game 20. As with the embodiment of FIG. 1, the player can accumulate multiple sets 32 between bonus games, wherein the player's entries in the next scheduled bonus game 20 is the cumulative total from all of the accumulated sets.

In certain embodiments, the players are provided with a bonus game board 36 that tracks the first bonus game symbols 30 and second bonus game symbols 34 acquired by the player. In the embodiment of FIG. 4, the game board 36 is a tabular compilation wherein positions in the table are marked or highlighted with the player's accumulated symbols, as indicated by the arrows in FIG. 4. It should be appreciated that any manner or configuration of game board 36 may be designed based on the type of primary and secondary games 12, 22, and bonus game 20.

In a particular embodiment, the game board 36 may be a virtual board accessed by the player via a website that automatically updates and visually associates the second bonus game symbols 34 with their respective predefined set 32 of first bonus game symbols 30, as in FIG. 4. For example, individual players may establish a respective bonus game account via the website, wherein each player is shown their own individualized game board 36 that is updated with a status of the first bonus game symbols 30 and second bonus game symbols 34 accumulated by the player. In an alternate embodiment, players may be provided with a "hard" game board (e.g. printed on paper or card stock) or "electronic" game board (e.g., application of a wireless device) that the player updates as the games progress.

FIGS. 6A through 6E relate to an embodiment of a game method and system having a particular game theme. Referring to FIG. 6A, a primary lottery game ticket 14 is embodied as a lottery ticket for a lottery draw game. The ticket 14 includes the player's draw numbers, as well as any other indicia necessary to conduct the first primary game. The ticket 14 includes indicia identifying a MONOPOLY game theme. In accordance with the game theme, the ticket 14 includes a first bonus game symbol 30 depicted as one of the real estate properties 40 from a conventional MONOPOLY board game, in this case the widely recognized "Boardwalk" property. Thus, with this embodiment, the first bonus game symbols 30 identify sets of property locations on the MONOPOLY game board. Instructions are also provided on the ticket 14 for the player to enter the ticket 14 into the bonus game 20. For example, the player is directed to access a lottery website at the web address printed on the ticket via any suitable Internet enabled device 38 (e.g., a computer, smart phone, or the like).

As mentioned above, the bonus game 20 may be administered through a players' club, wherein players establish an individual account maintained by the lottery authority for the purpose of entering, tracking, and qualifying for and playing the bonus games. The players access their account via an Internet enabled device at the website address provided on the ticket 14. Each player may have an individual account number.

FIG. 6B is a screen shot illustrating entry of the primary lottery game ticket 14 and, if utilized, a secondary primary game ticket 24 into the bonus game. At window 48, the player is instructed to enter the draw ticket club number 44 (or other unique identifying information, such as a serial number or the like) from the ticket 14 of FIG. 6A. At window 50, the player is instructed to enter identifying information from the scratch-off ticket 24 of FIG. 6A, such as the serial number 25. A game board 36 is also provided, which is updated with first game symbols 30 and, if utilized, second game symbols 34 upon entry and verification of the respective game tickets 14, 22.

FIG. 6C is an example of a screen shot 52 provided to the player that tracks and updates the player's accumulation of bonus game symbols. For example, the screen shot 52 informs the particular player that they have accumulated the "Park Place" and "Boardwalk" property locations.

As mentioned above, the bonus game may include linking of a second primary game to the bonus game. In this regard, referring to FIG. 6A, the second game ticket 24 is embodied as an instant lottery scratch-off ticket having any manner of game indicia 26 relating to the overall MONOPOLY game theme. With this embodiment, however, the second bonus game symbol is not provided directly on the ticket 24. The player is provided instructions 46 on the ticket 24 to access the bonus game website, at which time the player will be provided the associated second bonus game symbol. For example, referring to FIG. 6D, the player may be provided a screen shot 54 identifying the second game symbol 34 that is linked to the bonus game. In the depicted embodiment, the second game symbol 34 is a house or hotel structure 42 built on one of the property locations on the MONOPOLY game board, such as "one hotel on Boardwalk" (as shown in FIG. 6D) or "two houses on Park Place", and so forth. As with the conventional MONOPOLY game, a greater number of house or hotel structures 42 associated with a property increases the location's value. For purposes of the bonus game 20, the structures 42 increase the number of entries into the bonus game 20 when the predefined set of property locations is completed by the player. For example, the screen shot 56 of FIG. 6E depicts the bonus game board 36 as a conventional MONOPOLY game board with the player's accumulation of properties highlighted (the first bonus game symbols equating to particular property locations). The screen shot 56 also informs the player that they have satisfied one of the predefined sets 32 of first bonus game symbols (e.g., all of the dark blue properties). The enhancement value provided by the second game symbol 34 (FIG. 6D) associated with the particular set 32 of game symbols is a multiplier of 3× attached to the two house structures 42. Thus, the initial award of ten entries into the bonus game for accumulating Park Place and Boardwalk from the first primary lottery game is multiplied by a factor of 3 to grant the player thirty entries into the bonus game, as depicted in FIG. 6E.

Referring to the figures in general, the present invention also encompasses a game system that embodies many of the methodology aspects discussed above.

Embodiments of the methods and systems disclosed herein may be executed by one or more suitable networked lottery gaming systems. Such system(s) may comprise one or more computing devices adapted to perform one or more embodiments of the methods disclosed herein. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also makes reference to the transmission of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

FIG. 7 is a diagram view of a representative gaming system 200 that may be used to practice aspects of the bonus game component in accordance with the present invention. The exemplary system 200 includes a central system 122 with a central controller 123 administered by a game provider that cooperates with one or more lottery jurisdictions to provide lottery products and services. It should be readily appreciated that the central controller 123 may include an integrated server, or the host central system 122 may include any manner of periphery server or other hardware structure. The host computer system 122 is configured to carry out the funding and gaming functions associated with the first and second primary games and bonus game program described herein.

The host central computer system 122 may be a single networked computer, or a series of interconnected computers having access to the network 110 via a gateway or other known networking system. Generally, the central controller 123 configured to communicate with, manage, execute and control individual terminal units 104 within the lottery jurisdiction, and to interface with the network enabled devices 116*a*, 116*b*, and 116*c* of the players for entry into and play of the bonus games, as described herein. The central controller 123 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The central controller 123 may be directly or indirectly connected through the I/O bus to any manner of peripheral devices such as storage devices, wireless adaptors, printers, and the like. In addition, a database (DB) may be communicatively connected to the central controller 123 and provide a data repository for the storage and correlation of information gathered from the individual terminal units 104 or devices 116. The information stored within the database may be information relating to individual players, games, or game card specific information.

Aspects of present system and method call for the players to interface with the host central computer system 122. This may be done directly, as illustrated in FIG. 7, or indirectly via the individual lottery jurisdiction servers 106. For example, the players may be provided with a website address printed on the first or second primary game tickets, whereby the player enters their game ticket into the bonus game program by accessing the central computer system 122 directly via a network enabled device 116*c* (for example, an Internet enabled PC 116*a*, or smart phone/mobile device 116*b*). Depending on the requirements of how the bonus games are actually conducted, the player may be directed to download gaming software to their PC or other network-enabled device that enables the player to perform all functions needed to participate in the second chance games. The network enabled devices 116 may be directly connected to the network 110 through a plurality of direct network links 118, thereby eliminating the need for the bus, router, or other networking equipment. The devices 116 are configured to execute one or more computer programs, such as an Internet browser program, to allow users to interact with the central computer system 122, and preferably include a visual display such as a monitor or screen. Alternatively, the visual display may be incorporated into a web-browser configured to display multimedia content. For instance, a player may access the system 122 remotely via an Internet web-browser on player device 116.

In one embodiment, the player's network enabled device may be located at a point of sale location for the first or second primary game lottery tickets, and may even be a part of the terminals 104. In this embodiment, a player may interact with the system 122 immediately after purchasing or receiving a primary game ticket.

Each lottery jurisdiction may be differently configured for purposes of carrying out various lottery functions within its borders. For purposes of discussion, each lottery jurisdiction may be considered as a node. The lottery jurisdiction nodes 120, in turn, may be directly connected and/or multiplexed to the network 110 via direct network links. Further, the direct network links may be secure communications channels physically hardened against tampering and/or the communications may be encrypted to prevent unauthorized access to information transmitted thereon.

With each lottery jurisdiction, a plurality of terminal units 104 may be provided at multiple locations and connected with a LAN or WAN. Further, the LAN and/or WAN connecting each of the terminal units 104 may include one or more separate and secure buses 108, routers 112, web servers 106, gateways and other networking equipment to provide continuous and/or redundant connectivity to the network 110. As discussed above, the network 110 may be communicatively connected to central host computers 122 and/or respective central controllers as well as associated databases to allow for implementation, storage, tracking and analysis of gaming and other features. The network 110 may also be connected to external systems (e.g., Facebook™' Twitter™, etc.) for different purposes. For example, the players may be notified through these external systems as to whether or not they won or lost in the primary or second chance games.

The terminal units 104 may be configured with any manner of hardware and software functionality to accept a player's entry and wager into a primary game, such as an on-line game or purchase of an instant game ticket. The terminal units 104 may also be configured for redeeming a player's game ticket after completion of the primary game, or completion of the second chance game of the player's choice. For example, the terminals may issue a credit slip that the player uses to collect their prize award at an establishment's cashier or an authorized lottery redemption center.

The terminals 104 may include any conventional feature known to those skilled in the art related to lottery terminals. The terminal 14 includes features and functionality to allow a player or retail clerk to enter the information required to participate in the lottery game. An exemplary terminal 14 includes a housing, one or more input devices, which may be a control panel having input keys, a display, a value input device such as a card reader, a play slip or ticket reader, and a ticket printer. The play slip reader is typically configured to read user selection marks, bar codes, magnetically stored information, or any other desired input information. Control panel input keys allow the player or retail clerk to select the game to be played, input the value to be wagered, manually enter selected lottery characters, and input any other information necessary to play the lottery game. The terminal may include a display which may be an LCD, a CRT, or touch-screen capable of receiving and displaying information related to the game. The value input device may include any device that can accept value or a wager from a customer, such as a card reader or an optical currency collector. The value input device may be integrated with external devices, such as a cash register or other retail terminals, to exchange information necessary to receive and record the wagering transaction. The game ticket printer may be used to print or otherwise encode game tickets with information selected or required to play the lottery game. The printer may provide game tickets that reflect a player's selection, or complete lottery slips if the selection was generated automatically by the terminal. It should be readily appreciated that particular embodiments of terminals 14 are not meant as a limitation of the invention, and that embodiments of the present invention may encompass any configuration of features and functionality to allow initiation and playing of a lottery game.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method for conducting and linking a televised game show with play of a lottery game in a plurality of different lottery jurisdictions, the televised game show having one or more episodes which include play of a plurality of mini-games followed by a final bonus game, comprising:

designating an audience for an episode of the televised game show of members from each of the plurality of different lottery jurisdictions, wherein each lottery jurisdiction has a defined minimum number of the members in the audience;

for play of each of the plurality of mini-games during the episode, selecting contestants from the audience and conducting play of the plurality of mini-games with the contestants during an initial taping of the episode of the televised game show; separately in time from the initial taping, conducting a second taping of play of a plurality of substitute mini-games with contestants from the audience, wherein the plurality of substitute mini-games includes at least one substitute mini-game for each lottery jurisdiction of the plurality of lottery jurisdictions where a winner from the contestants of the substitute mini-game is from the respective lottery jurisdiction;

storing the second taping of the plurality of substitute mini-games;

selecting one or more winners from the plurality of mini-games conducted for play of the final bonus game and a chance to win an increased prize;

playing the final bonus game during the initial taping and selecting one or more winners for the increased prize;

storing the initial taping; determining one or more non-winner lottery jurisdictions from the plurality of lottery jurisdictions, wherein the one or more non-winner lottery jurisdictions being those lottery jurisdictions of the plurality of lottery jurisdictions that did not have a selected winner in at least one of the plurality of mini-games conducted during the initial taping;

determining one or more winner lottery jurisdictions from the plurality of lottery jurisdictions, wherein the one or more winner lottery jurisdictions being those lottery jurisdictions of the plurality of lottery jurisdictions that did have a selected winner in at least one of the plurality of mini-games conducted during the initial taping;

broadcasting the initial taping through a communications network to the winner lottery jurisdictions; and for each of the non-winner lottery jurisdictions, preparing a modified version of the initial taping for broadcast by retrieval and inclusion of at least one of the substitute mini-games where the winner is from the respective non-winner lottery jurisdiction into the initial taping and broadcasting only the modified version of the initial taping, through the communications network, to the respective non-winner lottery jurisdiction.

2. The method as in claim 1, wherein the retrieval and inclusion of the one or more substitute mini-games includes replacing one of the plurality of mini-games in the initial taping.

3. The method as in claim 1, wherein the retrieval and inclusion of the one or more substitute mini-games is in addition to the plurality of mini-games in the initial taping.

4. The method as in claim 1, wherein retrieval and inclusion of the one or more substitute mini-games in the modified version of the initial taping does not affect selection of the one or more winners from the plurality of mini-games in the initial taping that plays the final bonus game.

5. The method as in claim 1, wherein the members in the audience from each of the plurality of lottery jurisdictions are randomly selected from a pool of players of a primary lottery game previously conducted in their lottery jurisdiction.

6. The method as in claim 5, wherein the players of the primary lottery game become entrants in the pool by accumulating game symbols from multiple plays of the primary lottery game in their lottery jurisdiction.

7. The method as in claim 6, wherein for each play of the primary lottery game, the players are issued lottery tickets having a game symbol associated therewith for play in a bonus game component that requires the players to collect a predefined set of different ones of the game symbols for entry in the pool, and periodically conducting bonus game drawings prior to the initial taping wherein a winner in each bonus game drawing is eligible to become a member in the audience of the televised game show for their lottery jurisdiction.

8. The method as in claim 7, wherein each lottery jurisdiction of the plurality of lottery jurisdictions has a defined minimum number of winners from their bonus game drawings present in the audience, and the contestants in the plurality of mini-games in the initial taping are randomly drawn from an entirety of the audience.

9. The method as in claim 7, wherein each lottery jurisdiction of the plurality of lottery jurisdictions has a defined minimum number of winners from their bonus game drawings present in the audience, and at least one of the contestants in the plurality of mini-games in the initial taping is randomly drawn from each lottery jurisdiction such that each lottery jurisdiction has at least one contestant in the plurality of mini games.

10. The method as in claim 7, wherein each lottery jurisdiction of the plurality of lottery jurisdictions is also assigned non-contestant audience member spots as a function of their respective jurisdictional participation in the primary lottery game and the contestants in the plurality of mini-games in the initial taping are drawn only from the winners from the bonus game drawings present in the audience.

11. The method as in claim 7, wherein the players are awarded a defined number of entries in the bonus game drawing, the number of entries being multiplied as a function of a multiplier symbol earned by the player in play of a second primary lottery game that is played separately from the primary lottery game.

12. The method as in claim 7, further comprising providing players with a bonus game board that tracks status of the game symbols acquired by the player.

13. The method as in claim 12, wherein the bonus game board has a MONOPOLY game theme, the game symbols identifying sets of MONOPOLY property locations on the bonus game board.

14. The method as in claim 13, wherein the bonus game board is a virtual game board provided to the players via a website accessible by the players.

15. The method as in claim 14, further comprising establishing individual player accounts that are accessible by the players via the website, the accounts including the player's virtual game board updated with a status of the game symbols accumulated by the player.

* * * * *